(12) United States Patent
Kobayashi et al.

(10) Patent No.: US 12,253,421 B2
(45) Date of Patent: Mar. 18, 2025

(54) TEMPERATURE ESTIMATION DEVICE

(71) Applicant: DENSO CORPORATION, Kariya (JP)

(72) Inventors: Hisaaki Kobayashi, Kariya (JP); Masakazu Yamamoto, Kariya (JP)

(73) Assignee: DENSO CORPORATION, Kariya (JP)

(*) Notice: Subject to any disclaimer, the term of this patent is extended or adjusted under 35 U.S.C. 154(b) by 489 days.

(21) Appl. No.: 17/692,691

(22) Filed: Mar. 11, 2022

(65) Prior Publication Data

US 2022/0196483 A1 Jun. 23, 2022

Related U.S. Application Data

(63) Continuation of application No. PCT/JP2020/034018, filed on Sep. 8, 2020.

(30) Foreign Application Priority Data

Sep. 12, 2019 (JP) .................................. 2019-166514

(51) Int. Cl.
*G01K 3/00* (2006.01)
*G01K 13/00* (2021.01)
(52) U.S. Cl.
CPC ............. *G01K 3/005* (2013.01); *G01K 13/00* (2013.01)
(58) Field of Classification Search
CPC ................................ G01K 3/005; G01K 13/00
See application file for complete search history.

(56) References Cited

U.S. PATENT DOCUMENTS

| 2010/0254059 A1 | 10/2010 | Iguchi et al. |
| 2013/0163138 A1 | 6/2013 | Higuchi et al. |
| 2017/0082192 A1 | 3/2017 | Kawabata |
| 2017/0104439 A1 | 4/2017 | Kobayashi et al. |

FOREIGN PATENT DOCUMENTS

| JP | 2007166827 A | * | 6/2007 |
| JP | 5786452 B2 | | 9/2015 |
| JP | 6508024 B2 | * | 5/2019 |
| JP | 2020-088911 A | | 6/2020 |
| JP | 6980077 B1 | * | 12/2021 |

OTHER PUBLICATIONS

Nov. 10, 2020 International Searc Report issued in International Patent Application No. PCT/JP2020/034018.

\* cited by examiner

*Primary Examiner* — Mirellys Jagan
(74) *Attorney, Agent, or Firm* — Oliff PLC

(57) ABSTRACT

A temperature estimation device includes: an initial value estimation unit that estimates an initial temperature value of an estimation target component at the start of operation of a power converter electrically connected to a power storage device; a variation estimation unit that estimates a temperature variation of the estimation target component based on the value of an electric current supplied from the power converter by the operation of the power converter; and a temperature estimation unit that calculates an estimated temperature of the estimation target component based on the initial temperature value and the temperature variation. The initial value estimation unit estimates the initial temperature value based on time elapsed between the previous issuance of a temperature estimation stop instruction for the estimation target component and the current issuance of a temperature estimation start instruction for the estimation target component.

13 Claims, 8 Drawing Sheets

WHEN ELAPSED TIME < Lth

WHEN ELAPSED TIME ≥ Lth

WHEN Lth1 ≤ ELAPSED TIME < Lth2

WHEN ELAPSED TIME ≥ Lth

TEMPERATURE ESTIMATION DEVICE

CROSS-REFERENCE TO RELATED APPLICATION

This application is the U.S. bypass application of International Application No. PCT/JP2020/034018 filed on Sep. 8, 2020 which designated the U.S. and claims priority to Japanese Patent Application No. 2019-166514 filed on Sep. 12, 2019, the contents of both of which are incorporated herein by reference.

TECHNICAL FIELD

The present disclosure relates to a temperature estimation device that is applicable to a system including a storage battery and a power converter electrically connected to the storage battery, and estimates the temperature of a component included in the system.

BACKGROUND

Conventionally, an in-vehicle system including a storage battery, an inverter connected to the storage battery, a rotating electrical machine, and a cable connecting the rotating electrical machine and the inverter is known. When an electric current flows to the cable in order to drive the rotating electrical machine, the cable generates heat. As a result, the temperature of the cable may exceed the upper tolerable limit thereof.

SUMMARY

According to the present disclosure, a temperature estimation device is applicable to a system including a power storage device and a power converter electrically connected to the power storage device and is used to estimate a temperature of an estimation target component included in the system and having a temperature increasing when electric power is transferred between the power converter and the power storage device by operation of the power converter. The temperature estimation device includes:
- an initial value estimation unit that estimates an initial temperature value of the estimation target component at the start of the operation of the power converter;
- a variation estimation unit that estimates a temperature variation of the estimation target component based on a value of an electric current supplied from the power converter by the operation of the power converter; and
- a temperature estimation unit that calculates an estimated temperature of the estimation target component based on the initial temperature value and the temperature variation.

The initial value estimation unit estimates the initial temperature value based on time elapsed between the previous issuance of a temperature estimation stop instruction for the estimation target component and current issuance of a temperature estimation start instruction for the estimation target component.

BRIEF DESCRIPTION OF THE DRAWINGS

The above features of the present disclosure will be made clearer by the following detailed description, given referring to the appended drawings. In the accompanying drawings.

DETAILED DESCRIPTION OF THE PREFERRED EMBODIMENTS

Figure 1:
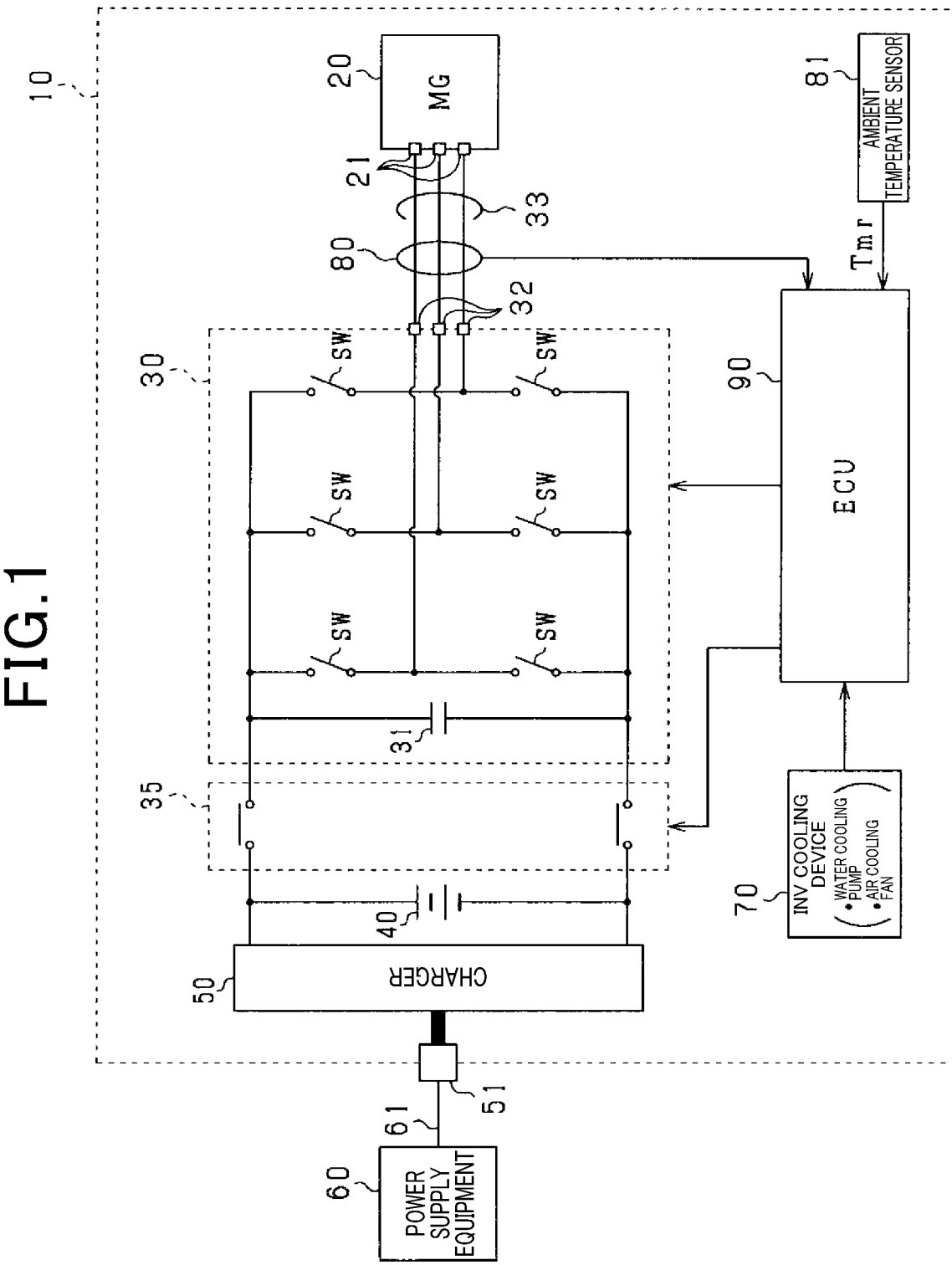
FIG. 1 is an overall configuration diagram of an in-vehicle system according to the first embodiment.

In view of the circumstances, as disclosed in JP 5786452 B, a known control device estimates the temperature of the cable or the ambient temperature of the cable and when determining that the estimated temperature exceeds a threshold temperature, limits the output of the rotating electrical machine in order to prevent the cable from being overheated.

At the time of estimating the temperature of the cable, if the initial temperature value of the cable is not properly set, the accuracy of estimating the temperature of the cable may be reduced. Particularly, there may be a reduction in the accuracy of estimating the temperature of the cable immediately after the rotating electrical machine is driven.

The following description will assume, for example, that in the situation where the cable is almost overheated, driving of the rotating electrical machine is stopped to cause the rotating electrical machine to stop and remain stationary, and then immediately after that, the rotating electrical machine is restarted. Regarding estimation of the temperature of the cable, suppose that the initial temperature value of the cable, for example, is set to a value equal to the ambient temperature of the cable. In this case, subsequently, under the situation where an electric current flows to the cable, the estimated temperature of the cable may be lower than the actual temperature of the cable. This leads to a concern that the actual temperature of the cable may exceed the upper tolerable limit thereof and the cable may be overheated.

Note that a target subject to the temperature estimation is not limited to the cable. In a system including a power storage device and a power converter electrically connected to the power storage device, as long as the target subject to the temperature estimation is a component included in the system and having a temperature increasing when electric power is transferred between the power converter and the power storage device by the operation of the power converter, the aforementioned problem may likewise occur.

The present disclosure has a primary object to provide a temperature estimation device capable of increasing the accuracy of estimating the temperature of an estimation target component.

According to the present disclosure, a temperature estimation device is applicable to a system including a power storage device and a power converter electrically connected to the power storage device and is used to estimate a temperature of an estimation target component included in the system and having a temperature increasing when electric power is transferred between the power converter and the power storage device by operation of the power converter. The temperature estimation device includes an initial value estimation unit that estimates an initial temperature value of the estimation target component at the start of the operation of the power converter, a variation estimation unit that estimates a temperature variation of the estimation target component based on a value of an electric current supplied from the power converter by the operation of the power converter, and a temperature estimation unit that calculates an estimated temperature of the estimation target component based on the initial temperature value and the temperature variation.

The initial value estimation unit estimates the initial temperature value based on time elapsed between the previous issuance of a temperature estimation stop instruction for the estimation target component and current issuance of a temperature estimation start instruction for the estimation target component.

According to the present disclosure, at the start of the operation of the power converter, the initial temperature value of the estimation target component is estimated. Subsequently, the temperature variation of the estimation target component is estimated based on the value of the electric current supplied from the power converter according to the operation of the power converter. Furthermore, the estimated temperature of the estimation target component is calculated based on the estimated initial temperature value and the estimated temperature variation.

The time elapsed between the previous issuance of the temperature estimation stop instruction for the estimation target component and the current issuance of the temperature estimation start instruction for the estimation target component has a significant impact on the accuracy of estimating the initial temperature value. In view of this point, the initial temperature value is estimated based on the elapsed time in the present disclosure. Therefore, the accuracy of estimating the temperature of the estimation target component can be increased.

First Embodiment

Hereinafter, the first embodiment of a temperature estimation device according to the present disclosure will be described with reference to the drawings. The temperature estimation device according to the present embodiment is included in a system to be installed in a hybrid vehicle, an electric vehicle, or the like.

As illustrated in FIG. 1, a vehicle 10 includes a rotating electrical machine 20, an inverter 30 serving as a power converter, and a storage battery 40 serving as a power storage device. The rotating electrical machine 20 is, for example, a star-connected, brushless synchronous machine. A rotor for the rotating electrical machine 20 is designed to be able to transmit motive power to driving wheels of vehicle 10. Thus, the rotating electrical machine 20 serves as a power source for travel of the vehicle 10.

The storage battery 40 is a secondary cell which can be charged and discharged and is specifically a lithium-ion battery or a nickel-metal hydride battery, for example. The storage battery 40 serves as a power supply source for the rotating electrical machine 20 when the rotating electrical machine 20 functions as an electric motor, and stores generated electric power when the rotating electrical machine 20 functions as an electric generator.

The inverter 30 includes: switches SW for the same number of pairs of upper and lower arms as the number of phases (three phases); and a capacitor 31 for smoothing. Each of the switches SW is, for example, a semiconductor switching element of the voltage control type and is specifically an N-channel metal-oxide-semiconductor field-effect transistor (MOSFET) or insulated-gate bipolar transistor (IGBT). In each phase, the connection point between the switches SW in the upper and lower arms is connected to a connector unit 32 of the inverter 30.

The vehicle 10 includes alternating current cables 33 for the three phases. In each phase, the first end of the alternating current cable 33 is connected to the connector unit 32 of the inverter 30, and the second end of the alternating current cable 33 is connected to a connector unit 21 of the rotating electrical machine 20. In each phase, the connector unit 21 of the rotating electrical machine 20 is connected to a stator winding of the rotating electrical machine 20.

The vehicle 10 includes a relay 35 that connects the storage battery 40 and the inverter 30. When the relay 35 is turned ON, the relay 35 electrically connects the storage battery 40 and the inverter 30 to each other, and when the relay 35 is turned OFF, the relay 35 electrically disconnects the storage battery 40 and the inverter 30 from each other.

The vehicle 10 includes a charger 50 serving as the power converter. A charging connector unit 51 of the charger 50 is designed to be connectable, via a charging cable 61, to power supply equipment 60 provided outside the vehicle 10. The charger 50 converts alternating current power supplied from the power supply equipment 60 via the charging cable 61 and the charging connector unit 51 into direct current power, and supplies the direct current power to the storage battery 40. Thus, the storage battery 40 is charged. Note that a relay is provided between the storage battery 40 and the charger 50 as well, but illustration of said relay is omitted in FIG. 1.

The vehicle 10 includes a cooling device 70 that cools the inverter 30. In the present embodiment, the cooling device 70 includes a cooling water passage in which a cooling fluid (cooling water) for cooling the inverter 30 flows, a pump configured to circulate the cooling water through said passage, and a fan configured to send air to the inverter 30 to cool the inverter 30.

The rotating electrical machine 20, the inverter 30, the alternating current cable 33, the relay 35, the storage battery 40, and the charger 50 are arranged in a motor compartment which is a predetermined device arrangement space provided in the vehicle 10. The motor compartment is provided in front of the driver's seat in the vehicle 10, for example.

The vehicle 10 includes a phase current sensor 80 and an ambient temperature sensor 81. The phase current sensor 80 detects a phase current flowing through the alternating current cable 33. In the present embodiment, a contactless phase current sensor including a current transformer, for example, is used as the phase current sensor 80. The ambient temperature sensor 81 measures the temperature in the motor compartment as an ambient temperature Tmr. Particularly, in the present embodiment, the ambient temperature sensor 81 measures the temperature in an area around the alternating current cable 33 in the motor compartment as the ambient temperature Tmr. Detection values of the phase current sensor 80 and the ambient temperature sensor 81 and the operating state of the cooling device 70 are input to an electronic control device (ECU 90) included in the vehicle 10.

The ECU 90, which is primarily composed of a microcomputer, operates the relay 35, operates each of the switches SW in the inverter 30 in order to control the torque of the rotating electrical machine 20 to conform to a command torque, and operates the charger 50 in order to charge the storage battery 40, for example. Note that in the present embodiment, the storage battery 40 is charged while the vehicle 10 is stationary. The ECU 90 can provide functions by way of software recorded in a tangible memory device, a computer and hardware that execute said software, or a combination thereof, for example.

The ECU 90 performs a temperature estimation process in which the temperature of a component in the in-vehicle system is estimated. In the present embodiment, the alternating current cable 33 is set to the target subject to the temperature estimation in said process. The ECU 90 performs the temperature estimation process during the period between when it is determined that a temperature estimation start instruction has been issued and when it is determined that a temperature estimation stop instruction has been issued, and suspends the temperature estimation process over the period between when it is determined that the temperature estimation stop instruction has been issued and when it is determined that the temperature estimation start instruction has been issued.

In the present embodiment, when the ECU 90 determines that a driving permission for the rotating electrical machine 20 has been issued, the ECU 90 determines that the temperature estimation start instruction has been issued. Furthermore, when the ECU 90 determines that a driving stop instruction for the rotating electrical machine 20 has been issued, the ECU 90 determines that the temperature estimation stop instruction has been issued. Therefore, an electric current does not flow to the alternating current cable 33 in the period between the issuance of the temperature estimation stop instruction and the issuance of the temperature estimation start instruction. Note that when the ECU 90 determines that the relay 35 has been switched ON, the ECU 90 may determine that the driving permission has been issued, and when the ECU 90 determines that the relay 35 has been switched OFF, the ECU 90 may determine that a driving stop instruction has been issued, for example.

Figure 2:
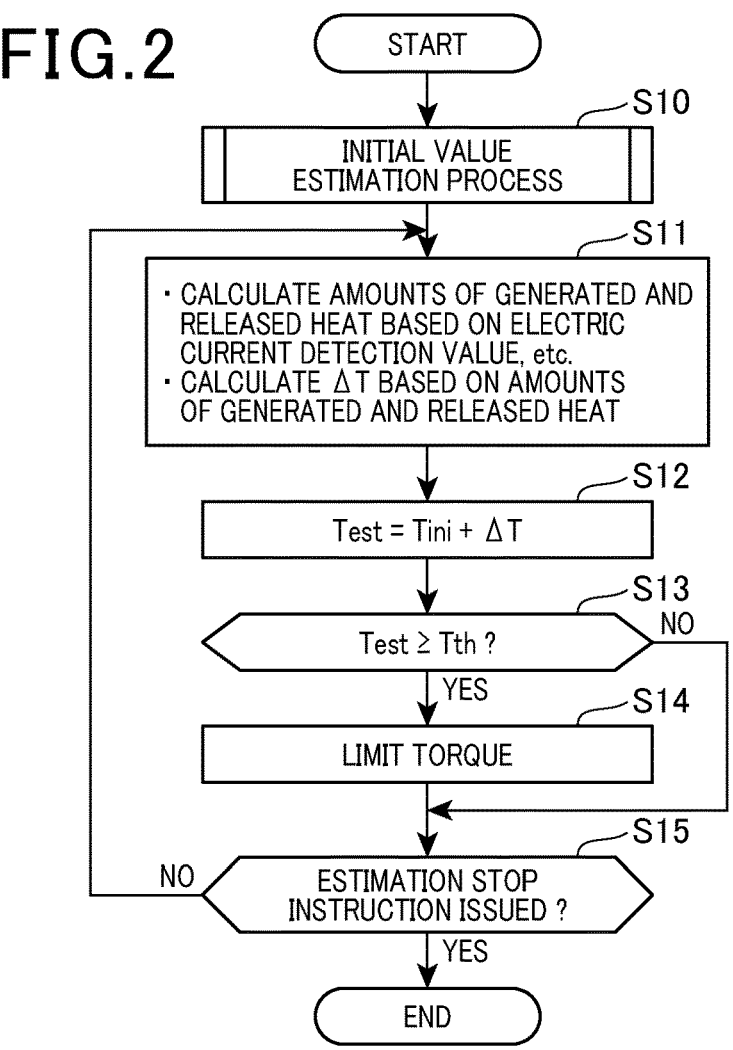
FIG. 2 is a flowchart showing a temperature estimation process.

FIG. 2 shows the temperature estimation process. This process is triggered by the determination that the temperature estimation start instruction for the alternating current cable 33 has been issued.

In Step S10, an initial value estimation process is performed in which an initial temperature value Tini of the alternating current cable 33 is estimated. This process will be described in detail later. Note that the process in Step S10 corresponds to the initial value estimation unit.

After completion of the process in Step S10, the processes in Steps S11 to S15 are performed. The processes in Steps S11 to S15 are repeatedly performed in a predetermined control cycle.

In Step S11, a temperature variation ΔT of the alternating current cable 33 after the issuance of the temperature estimation start instruction is calculated based on the value of an electric current detected by the phase current sensor 80 and the ambient temperature Tmr measured by the ambient temperature sensor 81. Specifically, the temperature variation ΔT is calculated based on the amount of heat generated at the alternating current cable 33 and the amount of heat released from the alternating current cable 33. It is sufficient that the amount of generated heat be calculated based on the value of the electric current detected by the phase current sensor 80 and the amount of heat received from heat-generating components located around the alternating current cable 33. Similarly, it is sufficient that the amount of released heat be calculated based on the temperature difference between the estimated temperature Test and the ambient temperature Tmr and the amount of heat released from the alternating current cable 33 by the cooling device 70. The amount of heat released by the cooling device 70 includes the amount of heat released by air blown from the fan to the alternating current cable 33 and the amount of heat released from the alternating current cable 33 by the cooling water circulated by the pump. Note that the process in Step S11 corresponds to the variation estimation unit.

In Step S12, the estimated temperature Test (n) of the alternating current cable 33 in the current control period is calculated by adding the temperature variation ΔT estimated in Step S11 to the initial temperature value Tini estimated in Step S10. Note that the process in Step S12 corresponds to the temperature estimation unit.

In Step S13, whether the estimated temperature Test calculated in Step S12 is greater than or equal to a threshold temperature Tth is determined.

When the result of the determination made in Step S13 is affirmative, the processing proceeds to Step S14, and the command torque is limited to the upper limit thereof. This suppresses an increase in the electric current (specifically, the amplitude of the alternating current) that flows to the alternating current cable 33, preventing the alternating current cable 33 from being overheated.

When the process in Step S14 is completed or when the result of the determination made in Step S13 is negative, the processing proceeds to Step S15, and whether the temperature estimation stop instruction has been issued is determined. When it is determined that the temperature estimation stop instruction has not been issued, the processing proceeds to Step S11. On the other hand, when it is determined that the temperature estimation stop instruction has been issued, the temperature estimation process is stopped.

Figure 3:
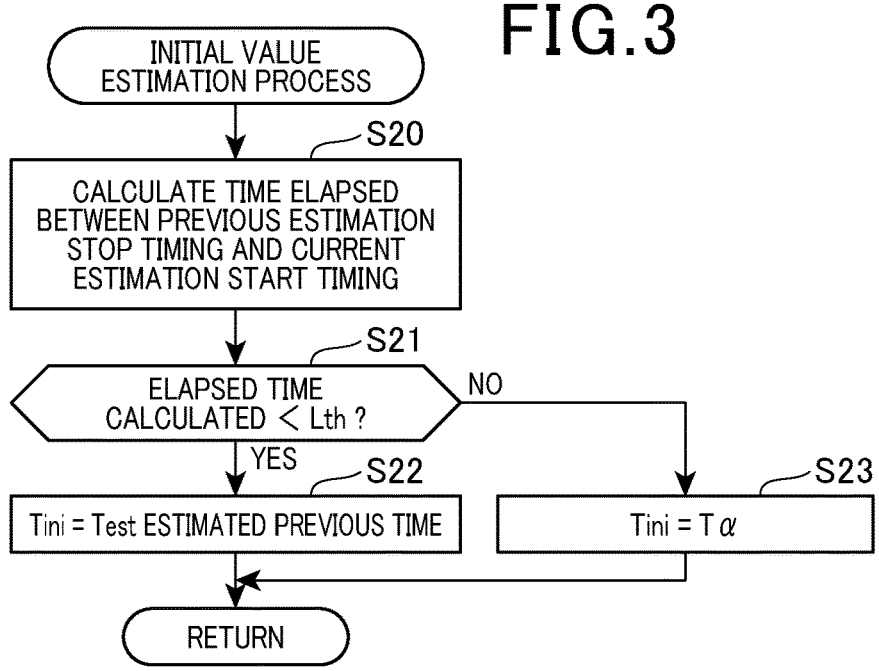
FIG. 3 is a flowchart showing an initial value estimation process.

FIG. 3 shows the initial value estimation process performed in Step S10.

In Step S20, the time elapsed between the previous issuance of the temperature estimation stop instruction and the current issuance of the temperature estimation start instruction is calculated.

In Step S21, whether the elapsed time calculated in Step S20 is less than predetermined time Lth is determined. It is sufficient that the predetermined time Lth be set to time required for the temperature of the alternating current cable 33 to reach the temperature in the motor compartment, for example. More specifically, for example, when the temperature in the motor compartment is maintained at a temperature equal to the upper limit of the possible range of the temperature in the motor compartment, it is sufficient that the predetermined time Lth be set to time required for the temperature of the alternating current cable 33 to reach the temperature in the motor compartment from the temperature equal to the upper limit of the possible range of the temperature of the alternating current cable 33. The predetermined time Lth is, for example, a value determined in advance according to experiments, numerical calculation, and the like.

When the result of the determination made in Step S21 is affirmative, the processing proceeds to Step S22, and the initial temperature value Tini is set to the estimated temperature Test calculated immediately before the previous issuance of the temperature estimation stop instruction.

On the other hand, when the result of the determination made in Step S21 is negative, the processing proceeds to Step S23, and the initial temperature value Tini is set to a predetermined temperature Tα. In other words, the initial temperature value Tini is reset to the predetermined temperature Tα. In the present embodiment, in response to the lapse of the predetermined time Lth after the previous issuance of the temperature estimation stop instruction, the predetermined temperature Tα the is set to upper limit (for example, 85° C.) of the possible range of the temperature of the alternating current cable 33. When the process in Step S22 or S23 is completed, the processing proceeds to Step S11.

Figure 4:
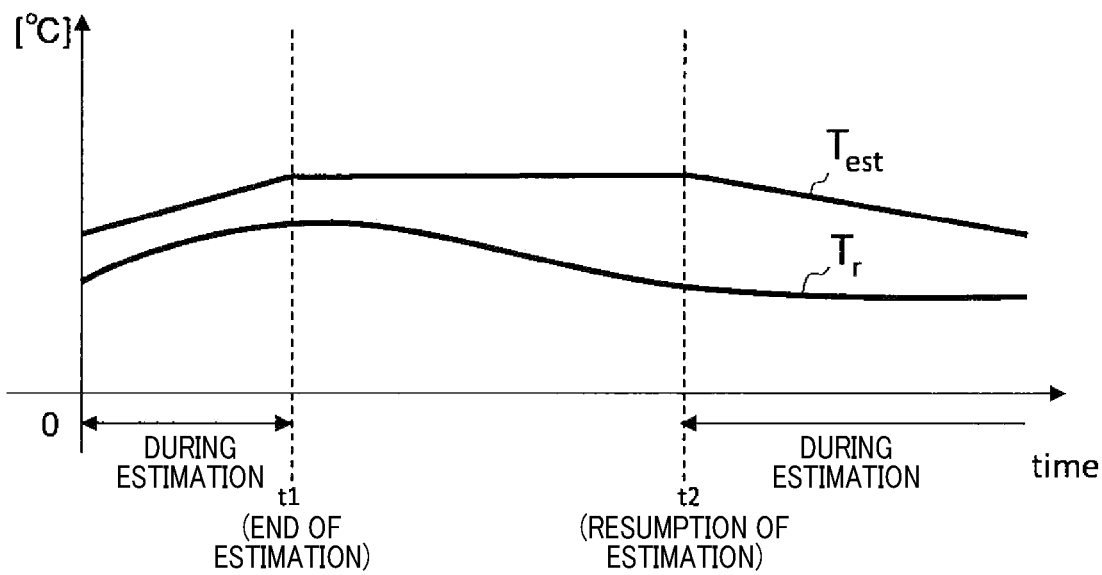
FIG. 4 is a timing chart showing an initial value estimation method when elapsed time is short.
Figure 5:
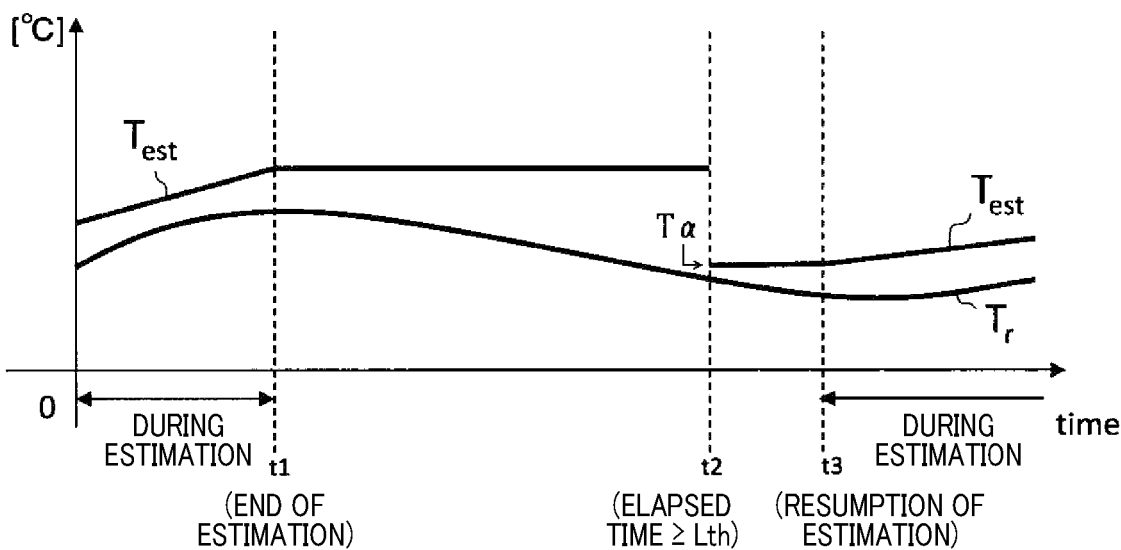
FIG. 5 is a timing chart showing the initial value estimation method when the elapsed time is long.

With reference to FIGS. 4 and 5, one example of the method for calculating the estimated temperature Test will be described.

First, the case where the elapsed time calculated is less than the predetermined time Lth will be described with reference to FIG. 4. In FIG. 4, Tr represents the actual temperature of the alternating current cable 33.

At time t1, the temperature estimation stop instruction is issued, and thus the temperature estimation process is stopped. Subsequently, at time t2, the temperature estimation start instruction is issued, and thus the temperature estimation process is resumed. At this time, the elapsed time expressed as time t1 to t2 is less than the predetermined time Lth, and thus the estimated temperature Test at time t1 is used as the initial temperature value Tini.

Next, the case where the elapsed time calculated is greater than or equal to the predetermined time Lth will be described with reference to FIG. 5.

At time t1, the temperature estimation stop instruction is issued, and thus the temperature estimation process is stopped. Subsequently, at time t3, the temperature estimation start instruction is issued, and thus the temperature estimation process is resumed. The elapsed time expressed as time t1 to t3 is greater than or equal to the predetermined time Lth, and thus the predetermined temperature Tα is used as the initial temperature value Tini. Although the estimated temperature Test changes by resetting at time t2 in FIG. 5 for convenience of description, the estimation process is stopped in the period between time t1 and time t3 in actuality.

According to the present embodiment described above in detail, the following advantageous effects can be obtained.

In the present embodiment, the initial temperature value Tini of the alternating current cable 33 is estimated at the start of the operation of the inverter 30. Subsequently, the temperature variation ΔT of the alternating current cable 33 is estimated based on the electric current detection value, etc., of the phase current sensor 80 during the operation of the inverter 30. Thereafter, the temperature Test of the alternating current cable 33 is estimated based on the estimated initial temperature value Tini and the estimated temperature variation ΔT.

When the time elapsed between the previous issuance of the temperature estimation stop instruction and the current issuance of the temperature estimation start instruction is determined as being less than the predetermined time Lth, the initial temperature value Tini is set to the estimated temperature Test calculated immediately before the previous issuance of the temperature estimation stop instruction. On the other hand, when the elapsed time is determined as being greater than or equal to the predetermined time Lth, the predetermined temperature Tα is set to the initial temperature value Tini. In this manner, the initial temperature value Tini is estimated according to the elapsed time, and thus the accuracy of estimating the temperature of the alternating current cable 33 can be increased. As a result, for example, when the vehicle 10 remains stationary for a long period of time, the estimated temperature Test of the alternating current cable 33 can be prevented from becoming too high as compared to the actual temperature of the alternating current cable 33, and when the vehicle 10 remains stationary for a short period of time, the estimated temperature Test of the alternating current cable 33 can be prevented from becoming too low as compared to the actual temperature of the alternating current cable 33.

In response to the lapse of the predetermined time Lth after the previous issuance of the temperature estimation stop instruction, the predetermined temperature Tα is set to the upper limit of the possible range of the temperature of the alternating current cable 33. Thus, the actual temperature of the alternating current cable 33 can reliably remain less than or equal to the estimated temperature Test, meaning that the alternating current cable 33 has proper overheat protection.

Second Embodiment

With reference to the drawings, the second embodiment will be described below, focusing on differences from the first embodiment. In the present embodiment, processing details of the initial value estimation process are different.

Figure 6:
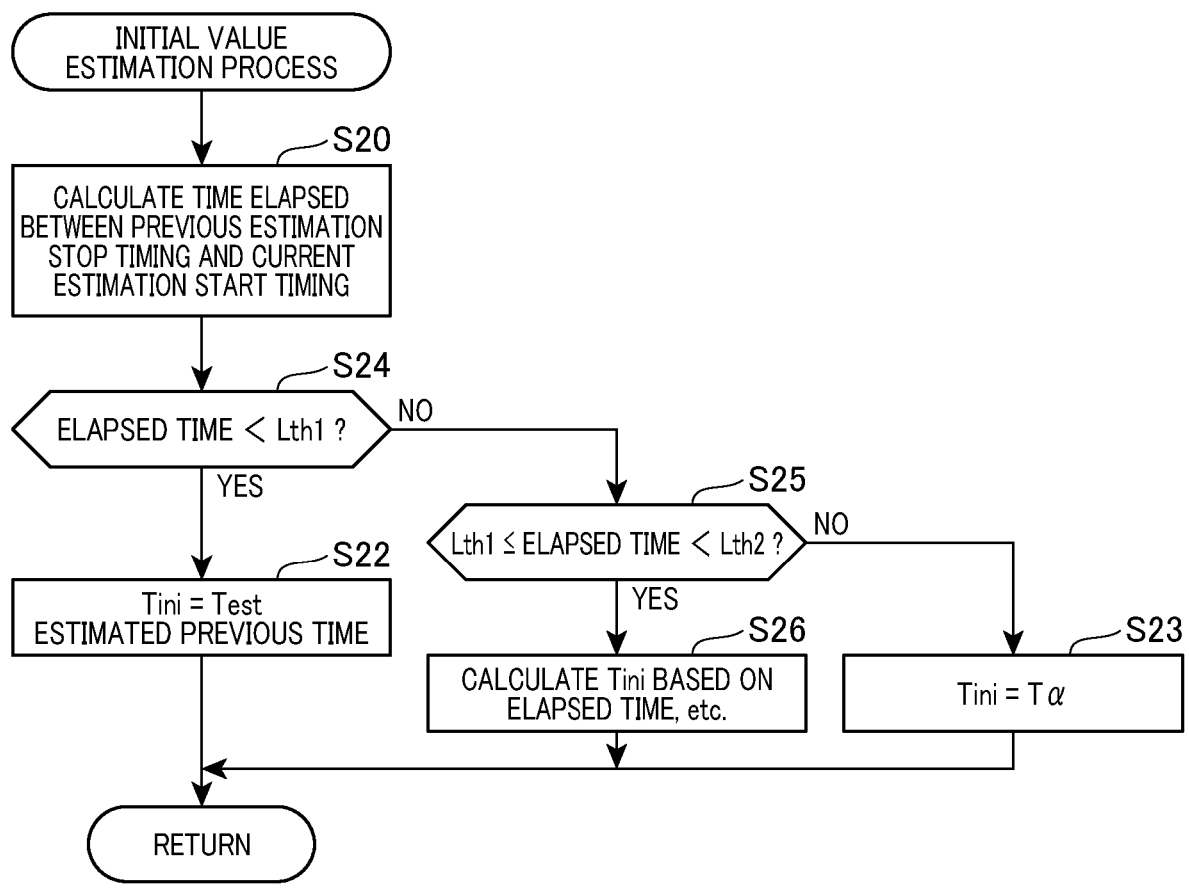
FIG. 6 is a flowchart showing an initial value estimation process according to the second embodiment.

FIG. 6 shows an initial value estimation process according to the present embodiment. In FIG. 6, processes that are the same as the processes illustrated in FIG. 3 described above are assigned the same reference signs for the sake of convenience.

After completion of Step S20, the processing proceeds to Step S24, and determines whether the elapsed time calculated is less than first predetermined time Lth1. When the result of the determination made in Step S24 is affirmative, the processing proceeds to Step S22.

On the other hand, when the result of the determination made in Step S24 is negative, the processing proceeds to Step S25, and whether the elapsed time calculated is greater than or equal to the first predetermined time Lth1 and is less than second predetermined time Lth2 (>Lth1) is determined. The predetermined time Lth described in the first embodiment is set to be equal to the second predetermined time Lth2, for example. When the elapsed time is determined as exceeding the second predetermined time Lth2 in Step S25, the processing proceeds to Step S23.

On the other hand, when the result of the determination made in Step S25 is affirmative, the processing proceeds to Step S26, and a value monotonically decreasing, in association with the elapsed time, from the estimated temperature Test calculated immediately before the previous issuance of the temperature estimation stop instruction, is estimated as the initial temperature value Tini. Hereinafter, with reference to FIG. 7, the method for estimating the initial temperature value Tini in Step S26 will be described.

Figure 7:
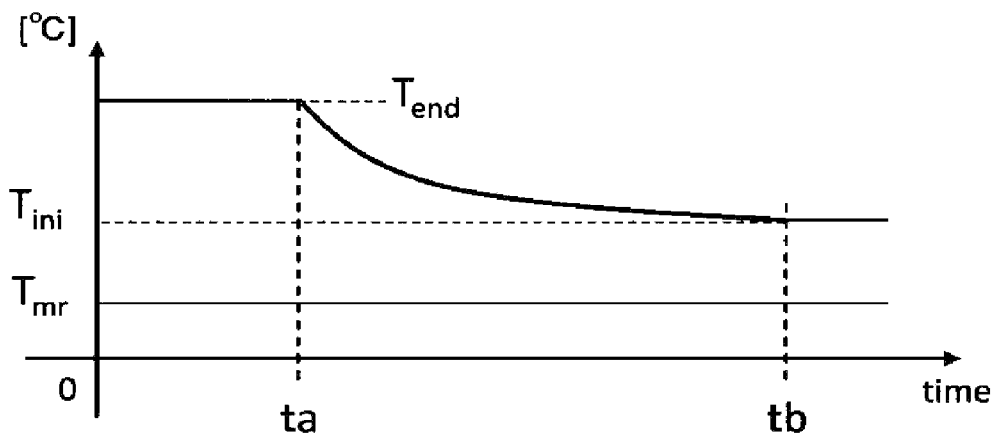
FIG. 7 is a timing chart showing the initial value estimation method.

In FIG. 7, ta represents the point in time of the previous issuance of the temperature estimation stop instruction, tb represents the point in time of the current issuance of the temperature estimation start instruction, and Tend represents a stop timing temperature which is the estimated temperature Test immediately before the previous issuance of the temperature estimation stop instruction. Therefore, "tb-ta" is the elapsed time calculated in Step S20. In this case, the initial temperature value Tini is estimated using the following Equation 1, the elapsed time calculated in Step S20, the ambient temperature Tmr, and the stop timing temperature Tend.

[Math. 1]

$$T_{ini} = T_{mr} + (T_{end} - T_{mr}) \times e^{\left(-\frac{t_b - t_a}{\tau}\right)}$$

Equation 1

The above Equation 1 is an estimated equation in which the stop timing temperature Tend asymptotically approaches the ambient temperature Tmr according to the elapsed time. A time constant τ on the right hand side of the above Equation 1 is, for example, a value adapted according to experiments, numerical calculation, and the like, and is set to one to two hours. It is sufficient that the time constant τ be set based on the time required for the temperature of the alternating current cable 33 to reach the temperature in the motor compartment, for example. More specifically, for example, when the temperature in the motor compartment is maintained at a temperature equal to the upper limit of the possible range of the temperature in the motor compartment, it is sufficient that the time constant τ be set based on the time required for the temperature of the alternating current cable 33 to reach the temperature in the motor compartment from the temperature equal to the upper limit of the possible range of the temperature of the alternating current cable 33.

Figure 8:
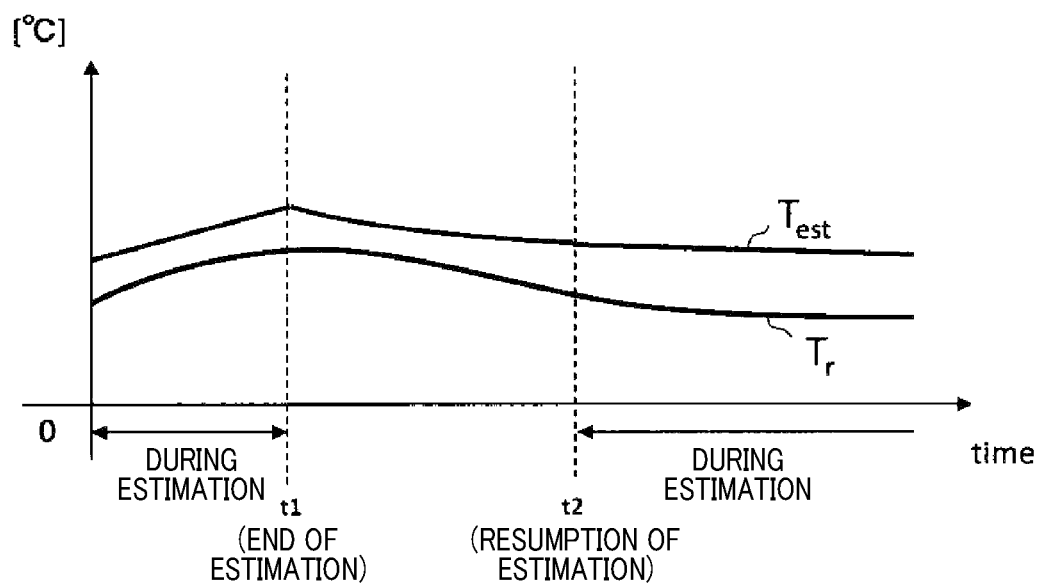
FIG. 8 is a timing chart showing the initial value estimation method when the elapsed time is moderate.

The case where the elapsed time calculated is greater than or equal to the first predetermined time Lth1 and is less than the second predetermined time Lth2 will be described with reference to FIG. 8.

At time t1, the temperature estimation stop instruction is issued, and thus the temperature estimation process is stopped. Subsequently, at time t2, the temperature estimation start instruction is issued, and thus the temperature estimation process is started. At this time, the initial temperature value Tini at time t2 depends on the elapsed time expressed as time t1 to t2, as explained earlier with reference to FIG. 7. Although the estimated temperature Test changes between time t1 and time t2 in FIG. 8 for convenience of description, the estimation process is stopped in the period between time t1 and time t2 in actuality.

According to the present embodiment described thus far, it is possible to increase the accuracy of estimating the temperature of the alternating current cable 33 when the elapsed time calculated is greater than or equal to the first predetermined time Lth1 and is less than the second predetermined time Lth2.

Third Embodiment

With reference to the drawings, the third embodiment will be described below, focusing on differences from the first and second embodiments. In the present embodiment, processing details of the initial value estimation process are different.

Figure 9:
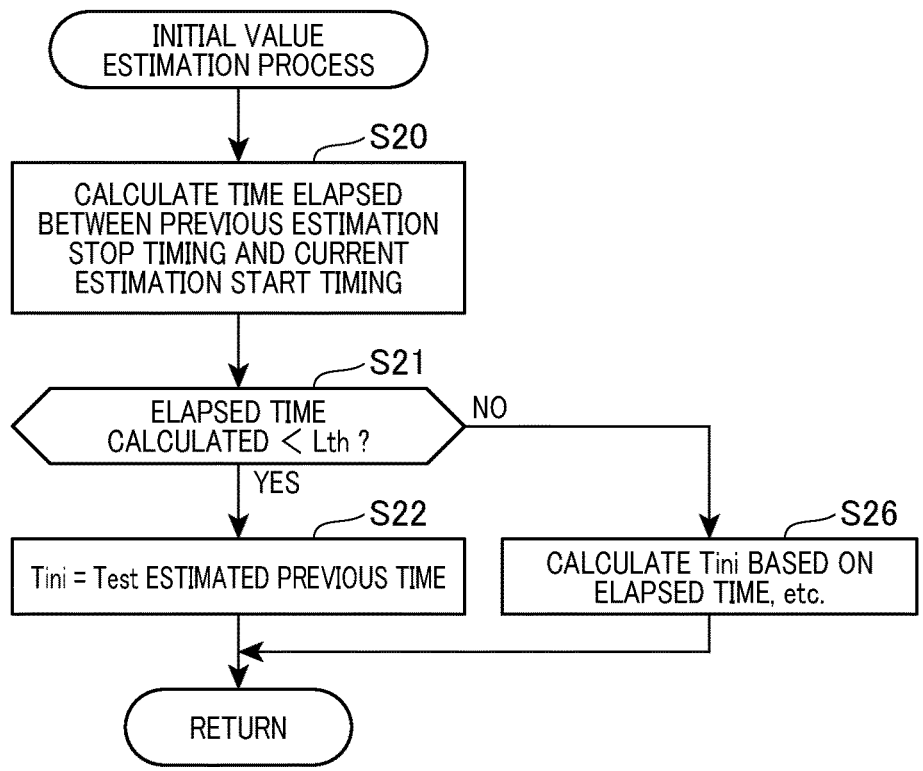
FIG. 9 is a flowchart showing an initial value estimation process according to the third embodiment.

FIG. 9 shows an initial value estimation process according to the present embodiment. In the present embodiment, when the result of the determination made in Step S21 is negative, the processing proceeds to Step S26. In FIG. 9, processes that are the same as the processes illustrated in FIGS. 3 and 6 described above are assigned the same reference signs for the sake of convenience.

According to the present embodiment described thus far, advantageous effects equivalent to the advantageous effects obtained according to the second embodiment can be obtained.

Fourth Embodiment

With reference to the drawings, the fourth embodiment will be described below, focusing on differences from the first embodiment. In the present embodiment, processing details of the initial value estimation process are different.

Figure 10:
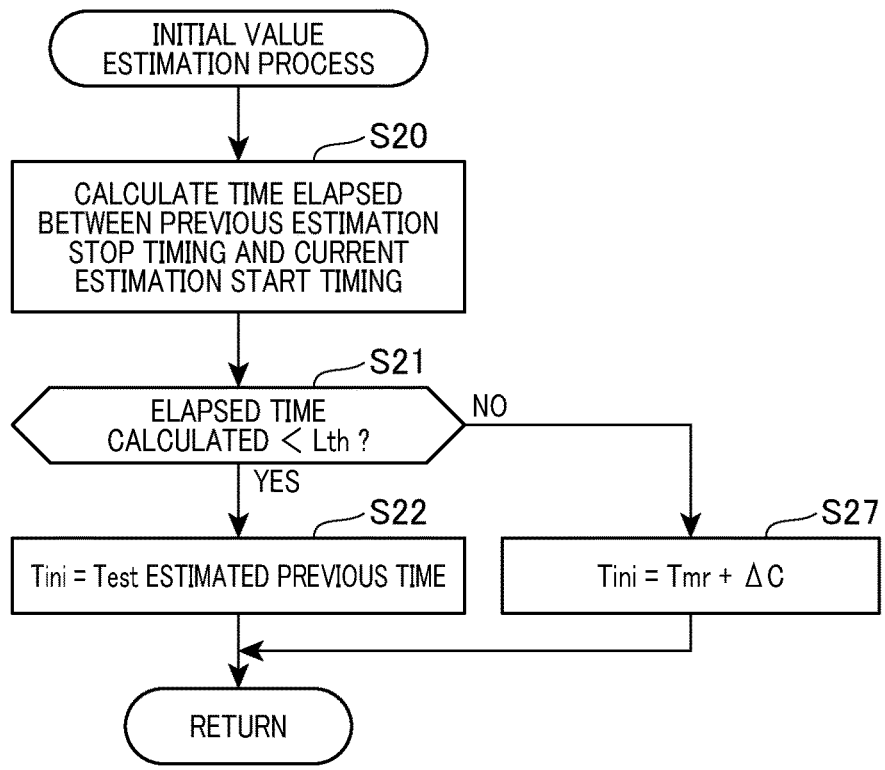
FIG. 10 is a flowchart illustrating an initial value estimation process according to the fourth embodiment.

FIG. 10 shows an initial value estimation process according to the present embodiment. In FIG. 10, processes that are the same as the processes illustrated in FIG. 3 described above are assigned the same reference signs for the sake of convenience.

When the result of the determination made in Step S21 is negative, the processing proceeds to Step S27, and the initial temperature value Tini is estimated based on the ambient temperature Tmr measured by the ambient temperature sensor 81. In the present embodiment, a predetermined offset amount ΔC is added to the ambient temperature Tmr; thus, the initial temperature value Tini is estimated to have a value that is less than or equal to the upper limit of the possible range of the temperature in the motor compartment and is greater than the ambient temperature Tmr.

Figure 11:
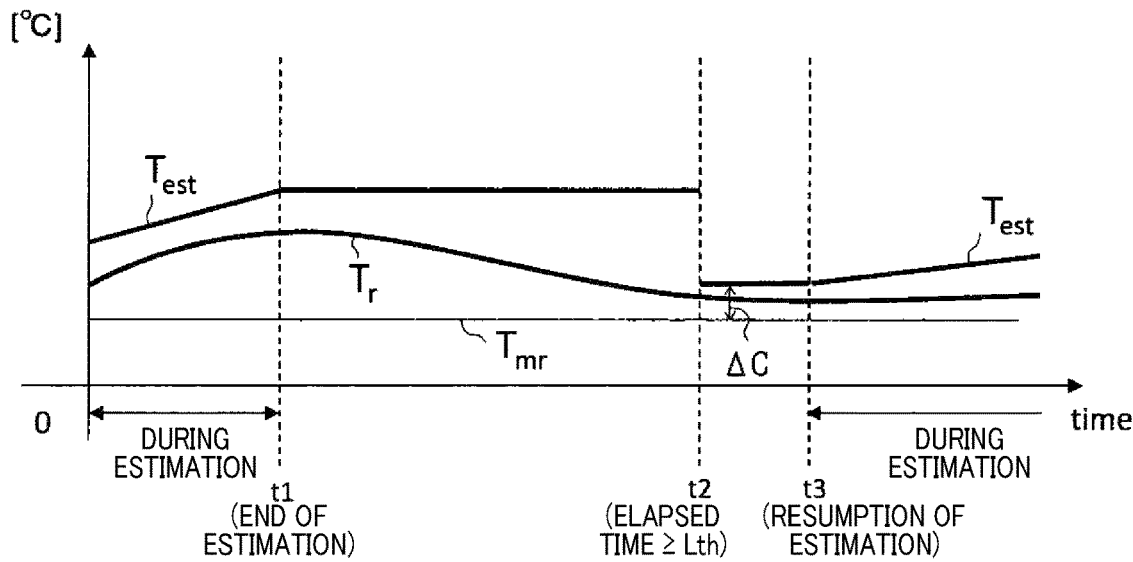
FIG. 11 is a timing chart showing the initial value estimation method when the elapsed time is long.

The case where the elapsed time calculated is greater than or equal to the predetermined time Lth will be described with reference to FIG. 11.

At time t1, the temperature estimation stop instruction is issued, and thus the temperature estimation process is stopped. Subsequently, at time t3, the temperature estimation start instruction is issued, and thus the temperature estimation process is started. At this time, the initial temperature value Tini at time t3 is a value obtained by adding the predetermined offset amount ΔC to the ambient temperature Tmr. Although the estimated temperature Test changes at time t2 in FIG. 11 for convenience of description, the estimation process is stopped in the period between time t1 and time t3 in actuality.

According to the present embodiment described thus far, advantageous effects similar to the advantageous effects obtained according to the first embodiment can be obtained.

Modification of Fourth Embodiment

When the vehicle 10 includes, as the ambient temperature sensor 81, a water temperature sensor that measures the temperature of the cooling water included in the cooling device 70, the temperature of the cooling water measured by the water temperature sensor may be used as the ambient temperature Tmr in Step S27. Furthermore, in this case, the target subject to the temperature estimation may be the capacitor 31. In this case, for example, the initial temperature value of the capacitor 31 which is disposed closer to a position at which the cooling water flows than the alternating current cable 33 is may be estimated to have the average value (for example, 65° C.) of the upper limit (for example, 85° C.) of the possible range of the temperature in the motor compartment and the temperature of the cooling water (for example, 45° C.).

Fifth Embodiment

With reference to the drawings, the fifth embodiment will be described below, focusing on differences from the first embodiment. In the present embodiment, processing details of the initial value estimation process are different.

Figure 12:
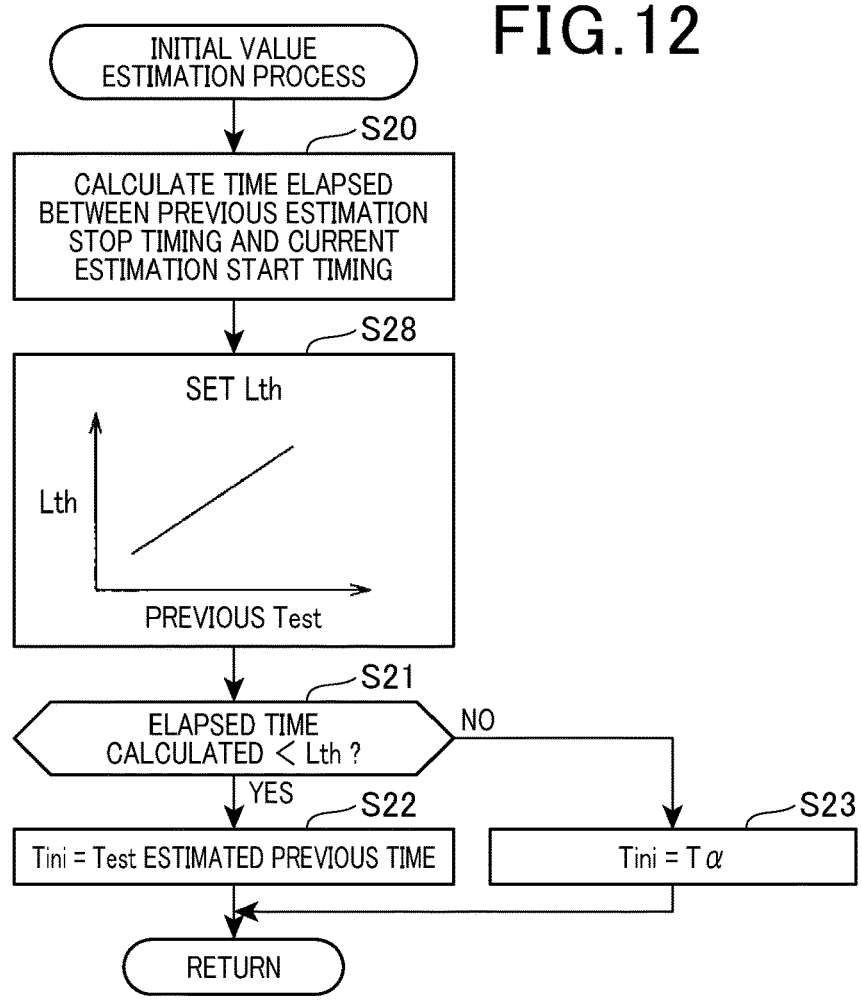
FIG. 12 is a flowchart showing an initial value estimation process according to the fifth embodiment.

FIG. 12 shows an initial value estimation process according to the present embodiment. In FIG. 12, processes that are the same as the processes illustrated in FIG. 3 described above are assigned the same reference signs for the sake of convenience.

When the process in Step S20 is completed, the processing proceeds to Step S28, and the predetermined time Lth is set greater as the estimated temperature Test calculated immediately before the previous issuance of the temperature estimation stop instruction (the stop timing temperature Tend according to the second embodiment) increases. Specifically, for example, when the estimated temperature Test calculated immediately before the previous issuance of the temperature estimation stop instruction is greater than the predetermined temperature Tα, the predetermined time Lth is set greater as the estimated temperature Test increases.

In the process in Step S28, when the estimated temperature Test is low, the estimated temperature Test is reset early to the predetermined temperature Tα, and when the estimated temperature Test is high, the resetting of the estimated temperature Test is delayed. Thus, in the case where the temperature estimation start instruction is issued, the initial temperature value Tini can be kept from falling below the actual temperature of the alternating current cable 33.

Sixth Embodiment

With reference to the drawings, the sixth embodiment will be described below, focusing on differences from the second embodiment. The present embodiment results from applying, to the second embodiment, the change in the predetermined time described in the fifth embodiment.

Figure 13:
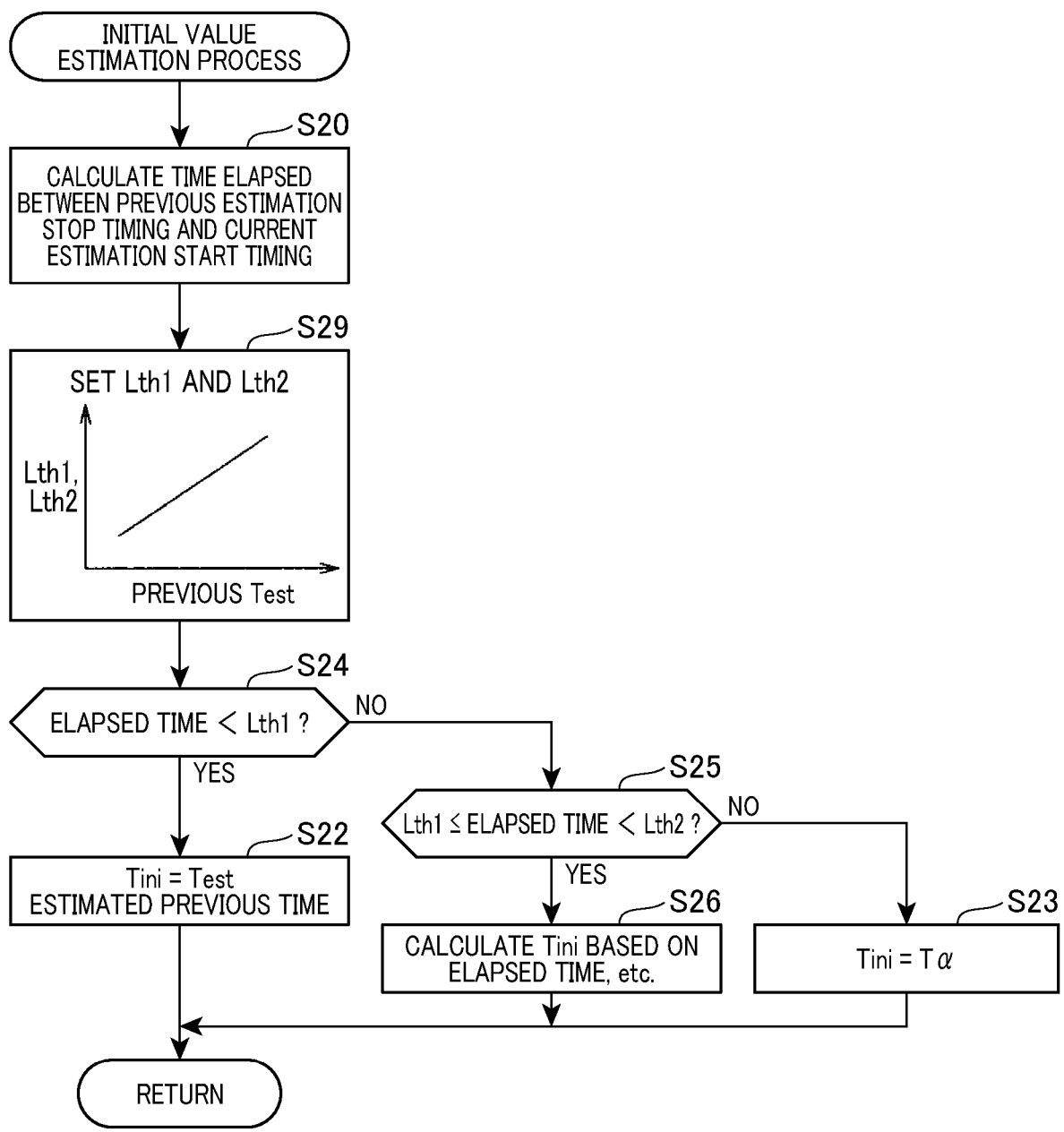
FIG. 13 is a flowchart showing an initial value estimation process according to the sixth embodiment.

FIG. 13 shows an initial value estimation process according to the present embodiment. In FIG. 13, processes that are the same as the processes illustrated in FIG. 6 described above are assigned the same reference signs for the sake of convenience.

When the process in Step S20 is completed, the processing proceeds to Step S29, and the first predetermined time Lth1 and the second predetermined time Lth2 are set greater as the estimated temperature Test calculated immediately before the previous issuance of the temperature estimation stop instruction increases. Specifically, for example, when the estimated temperature Test calculated immediately before the previous issuance of the temperature estimation stop instruction is greater than the predetermined temperature Tα, the first predetermined time Lth1 and the second predetermined time Lth2 are set greater as the estimated temperature Test increases.

Other Embodiments

Note that the above embodiments may be modified and implemented as follows.
- The process in Step S23 in FIG. 6 may be changed into the process in Step S27 in FIG. 10.
- In Step S11 in FIG. 2, the temperature variation ΔT in one control period may be calculated. In this case, in Step S12, it is sufficient that the estimated temperature Test (n) in the current control period be calculated by adding the temperature variation ΔT calculated in Step S11 to the estimated temperature Test (n-1) calculated in the previous control period.
- The ambient temperature sensor 81 may measure the temperature in the area around the vehicle 10 as the ambient temperature Tmr, for example, as long as the temperature correlates with the temperature in the motor compartment. Furthermore, the ambient temperature Tmr to be used in the temperature estimation process is not limited to the detection value of the sensor and may be an estimated value obtained by estimation in a predetermined process.
- For example, in a rotating electrical machine of the integrated mechanical and electrical type resulting from integration of the inverter 30 and the rotating electrical machine 20, there are cases where an electrical path connecting the inverter 30 and the rotating electrical machine 20 is a busbar instead of the alternating current cable 33. In this case, it is sufficient that the target subject to the temperature estimation in the temperature estimation process be set to the busbar.
- The target subject to the temperature estimation is not limited to the alternating current cable 33. For example, the target subject to the temperature estimation may be the capacitor 31, the connector unit 32 of the inverter 30, or the connector unit 21 of the rotating electrical machine 20 as long as this component is included in the system and is included in a path in which an electric current flows by the operation of the inverter 30.
- Furthermore, the target subject to the temperature estimation is not limited to the alternating current cable 33 and may be, for example, the phase current sensor 80, the charging connector unit 51 of the charger 50, or the like.
- In a system in which the temperature estimation stop instruction is issued in response to issuance of an instruction to stop the ECU 90 and the temperature estimation start instruction is issued in response to issuance of an instruction to start the ECU 90, in response to the current issuance of the instruction to start the ECU 90, the ECU 90 may estimate the initial temperature value Tini based on the time elapsed between the previous issuance of the instruction to stop the ECU 90 and the current issuance of the instruction to start the ECU 90. This estimation method is applied, for example, when the ECU 90 is operating while the rotating electrical machine 20 remains stationary, specifically, for example, during charging of the storage battery 40 using the power supply equipment 60. In this case, at the start of the operation of the charger 50, the initial temperature value of the charging connector unit 51 of the charger 50 can be properly estimated, and moreover the accuracy of estimating the temperature of the charging connector unit 51 during charging can be increased. Note that when the target subject to the temperature estimation is the charging connector unit 51, it is sufficient that the temperature variation ΔT be calculated based on a detection value of a power current sensor that detects an electric current flowing to the storage battery 40 or a charging electric current value transmitted from the power supply equipment 60, for example.
- The number of targets subject to the temperature estimation is not limited to one and may be two or more.
- The controllers and the methods used by the controllers that are described in the present disclosure may be implemented using a dedicated computer provided by configuring memory and a processor programmed by a computer program so as to perform one or more specific functions. Alternatively, the controllers and the methods used by the controllers that are described in the present disclosure may be implemented using a dedicated computer provided by configuring a processor with one or more dedicated hardware logic circuits. Alternatively, the controllers and the methods used by the controllers that are described in the present disclosure may be implemented using one or more dedicated computers including a combination of: memory and a processor programmed so as to perform one or more functions; and a processor configured with one or more hardware logic circuits. The computer program may be stored in a tangible non-transitory computer-readable recording medium as an instruction to be performed by a computer.

While the present disclosure has been described with reference to embodiments thereof, it is to be understood that the disclosure is not limited to the embodiments and constructions. The present disclosure is intended to cover various modification examples and modifications within the range of equivalency. In addition, various combinations and configurations, and further, other combinations and configurations including more, less, or only a single element, are also within the spirit and scope of the present disclosure.

What is claimed is:

1. A temperature estimation device for estimating a temperature of an estimation target component, the temperature estimation device being applicable to a system including a power storage device and a power converter electrically connected to the power storage device, the estimation target component being a component included in the system and having a temperature increasing when electric power is transferred between the power converter and the power storage device by operation of the power converter, the temperature estimation device comprising:

an initial value estimation unit that estimates an initial temperature value of the estimation target component at a start of the operation of the power converter;

a variation estimation unit that estimates a temperature variation of the estimation target component based on a value of an electric current supplied from the power converter by the operation of the power converter; and a temperature estimation unit that calculates an estimated temperature of the estimation target component based on the initial temperature value and the temperature variation, wherein the initial value estimation unit estimates the initial temperature value based on a time elapsed between a previous issuance of a temperature estimation stop instruction for the estimation target component and a current issuance of a temperature estimation start instruction for the estimation target component.

2. The temperature estimation device according to claim 1, wherein in response to the time elapsed being less than a predetermined time, the initial value estimation unit sets, as the initial temperature value, the estimated temperature calculated in response to the previous issuance of the temperature estimation stop instruction; and in response to the time elapsed being greater than or equal to the predetermined time, the initial value estimation unit sets, as the initial temperature value, a value monotonically decreasing, in association with the time lapsed, from the estimated temperature calculated in response to the previous issuance of the temperature estimation stop instruction.

3. The temperature estimation device according to claim 1, wherein the power converter is not in operation and the electric current is not supplied from the power converter in a period between the previous issuance of the temperature estimation stop instruction and the current issuance of the temperature estimation start instruction.

4. The temperature estimation device according to claim 1, wherein the system includes a rotating electrical machine, an inverter serving as the power converter, an electrical path connecting the rotating electrical machine and the inverter, and an electric current sensor that detects an electric current flowing in the electrical path, which is the electric current supplied from the power converter by the operation of the power converter, and the variation estimation unit estimates the temperature variation based on a value of the electric current detected by the electric current sensor.

5. The temperature estimation device according to claim 4, wherein the temperature estimation stop instruction is issued in response to an issuance of a driving stop instruction for the rotating electrical machine, the temperature estimation start instruction is issued in response to an issuance of a driving permission for the rotating electrical machine, and in response to a current issuance of the driving permission, the initial value estimation unit estimates the initial temperature value based on a time elapsed between a previous issuance of the driving stop instruction and the current issuance of the driving permission.

6. The temperature estimation device according to claim 1, wherein in response to the time elapsed being less than a predetermined time, the initial value estimation unit sets, as the initial temperature value, the estimated temperature calculated in response to the previous issuance of the temperature estimation stop instruction; and in response to the time elapsed being greater than or equal to the predetermined time, the initial value estimation unit sets a predetermined temperature to the initial temperature value.

7. The temperature estimation device according to claim 6, wherein in response to the predetermined time having elapsed since the previous issuance of the temperature estimation stop instruction, the initial value estimation unit sets the predetermined temperature to an upper limit of a possible range of the temperature of the estimation target component.

8. The temperature estimation device according to claim 6, wherein the initial value estimation unit sets the predetermined temperature based on an ambient temperature of the estimation target component.

9. The temperature estimation device according to claim 6, wherein the initial value estimation unit sets the predetermined time greater as the estimated temperature calculated in response to the previous issuance of the temperature estimation stop instruction increases.

10. The temperature estimation device according to claim 1, wherein:

in response to the time elapsed being less than a first predetermined time, the initial value estimation unit sets, as the initial temperature value, the estimated temperature calculated in response to the previous issuance of the temperature estimation stop instruction;

in response to the time elapsed being greater than or equal to the first predetermined time and being less than a second predetermined time greater than the first predetermined time, the initial value estimation unit sets, as the initial temperature value, a value monotonically decreasing, in association with the time lapsed, from the estimated temperature calculated in response to the previous issuance of the temperature estimation stop instruction; and in response to the time elapsed being greater than or equal to the second predetermined time, the initial value estimation unit sets the initial temperature value to a predetermined temperature.

11. The temperature estimation device according to claim 10, wherein the initial value estimation unit sets the first predetermined time and the second predetermined time greater as the estimated temperature calculated in response to the previous issuance of the temperature estimation stop instruction increases.

12. The temperature estimation device according to claim 10, wherein in response to the second predetermined time having elapsed since the previous issuance of the temperature estimation stop instruction, the initial value estimation unit sets the predetermined temperature to an upper limit of a possible range of the temperature of the estimation target component.

13. The temperature estimation device according to claim 10, wherein the initial value estimation unit sets the predetermined temperature based on an ambient temperature of the estimation target component.

* * * * *